United States Patent
Leclair et al.

(10) Patent No.: US 6,520,878 B1
(45) Date of Patent: Feb. 18, 2003

(54) DRIVING PULLEY FOR SCOOTERS AND OTHER VEHICLES

(75) Inventors: Alexandre Leclair, Boucherville (CA); Christian Mercier, Drummondville (CA); Josée Lacouline, Drummonville (CA); Rémi Breton, Saint-Charles-de-Drummond (CA)

(73) Assignee: Cvtech R & D Inc., Drummondville (CA)

( * ) Notice: Subject to any disclaimer, the term of this patent is extended or adjusted under 35 U.S.C. 154(b) by 0 days.

(21) Appl. No.: 09/553,309

(22) Filed: Apr. 20, 2000

Related U.S. Application Data
(60) Provisional application No. 60/130,946, filed on Apr. 26, 1999.

(30) Foreign Application Priority Data
Apr. 23, 1999 (CA) .............................................. 2270002

(51) Int. Cl.[7] .............................................. F16H 61/00
(52) U.S. Cl. .............................. 474/14; 474/12; 474/13
(58) Field of Search ............................ 474/12, 13, 14, 474/21, 19, 25, 8

(56) References Cited
U.S. PATENT DOCUMENTS

| | | | | |
|---|---|---|---|---|
| 2,556,512 A | * | 6/1951 | Ammon | 474/14 |
| 2,795,962 A | * | 6/1957 | Uher | 474/14 |
| 3,599,504 A | * | 8/1971 | Taylor | 474/12 |
| 3,757,593 A | * | 9/1973 | Svenson | 474/12 |
| 3,824,867 A | * | 7/1974 | Brooks | 474/13 |
| 4,216,678 A | * | 8/1980 | Butterfield et al. | 474/12 |
| 4,360,353 A | * | 11/1982 | Hattori et al. | 474/12 |
| 4,364,735 A | * | 12/1982 | Plamper et al. | 474/13 X |
| 4,772,248 A | | 9/1988 | De Briel | 474/14 |

* cited by examiner

Primary Examiner—David A. Bucci
Assistant Examiner—Marcus Charles
(74) Attorney, Agent, or Firm—Bourque & Associates, P.A.

(57) ABSTRACT

The driving pulley (12) is used in a continuously variable transmission (CVT) and comprises two flanges (22,24) around which a drivebelt (20) is partially wound. The first flange (22) is fixed in translation with reference to the drive shaft (16) while the second flange (24) is movable, with reference to the first flange (22), between a distal position and a proximal position. The driving pulley (12) is provided with an arrangement which allows the return force on the second flange (24) to be maximum when the second flange (24) is at the distal position, and minimum when the second flange (24) is at the proximal position. The driving pulley (12) is also capable of being disengaged from the drivebelt (20) at a low rotation speed. This driving pulley (12) is particularly well adapted for use on a scooter.

23 Claims, 12 Drawing Sheets

DRIVING PULLEY FOR SCOOTERS AND OTHER VEHICLES

The present application claims the benefit of U.S. provisional patent application Ser. No. 60/130,946, filed Apr. 26, 1999, which is hereby incorporated by reference and Canadian Patent Application Ser. No. 2,270,002, filed Apr. 23, 1999.

FIELD OF THE INVENTION

The present invention relates to power transmissions, and in particular to a driving pulley for use in a continuously variable transmission.

A continuously variable transmission (CVT) is a mechanical device in which the torque transmission ratio is infinitely variable over the required working range, by contrast to a conventional transmission in which there is a limited number of selectable torque transmission ratios. A CVT automatically changes the ratio as required by load and speed conditions, providing an increased torque under high loads at low speeds and yet controlling the rotation speed of the motor as the vehicle accelerates. It is commonly used in a wide range of vehicles, such as small cars or trucks, snowmobiles, golf carts, all-terrain vehicles (ATV) and scooters. A CVT is used with internal combustion engines or electric motors.

A conventional CVT comprises a driving pulley connected to a motor, a driven pulley connected to wheels or a track, and a trapezoidal drivebelt transmitting torque between the driving pulley and the driven pulley. The sides of the drivebelt are, on each pulley, gripped between two opposite flanges that are to be coaxially mounted around a main shaft. One of the flanges is axially movable with reference to the other. Each pulley is directly or indirectly in a torque-transmitting engagement with the main shaft.

The driving pulley comprises a centrifugal mechanism that tends to increase the ratio when the rotation speed of the driving pulley increases. To do so, the centrifugal mechanism is able to apply a force on the movable flange to move it closer to the fixed flange. This will force the drivebelt to wind on a larger diameter on the driving pulley. At the same time, the change in the position of the drivebelt will cause a radial force to be exerted on the flanges of the driven pulley, in addition to the tangential driving force by which the torque is transmitted. This radial force urges the second flange of the driven pulley away from the first flange thereof.

Initially, when the vehicle is stopped, the winding diameter of the driving pulley is minimum and the winding diameter of the driven pulley is maximum. This is referred to as the minimum ratio since there is the minimum number of rotations or fraction of rotation of the driven pulley for each full rotation of the driving pulley. Then, when the vehicle accelerates, the movable parts of the CVT will constantly seek to rearranged their position until an equilibrium is reached or until they reach the maximum ratio. The ratio at which the CVT stabilizes is an equilibrium between the forces on the drivebelt in the driving pulley and in the driven pulley.

At the maximum rotation speed, the ratio is maximum as there is the maximum number of rotations or fraction of rotation of the driven pulley for each full rotation of the driving pulley.

When the rotation speed of the motor decreases, the force generated by the centrifugal mechanism decreases. Return springs located in the driving and driven pulleys allow the corresponding movable flanges to move back to their original low ratio position.

The driven pulley of a CVT is also torque-sensitive. This allows the driven pulley to counterbalance the force generated by the centrifugal mechanism of the driving pulley so as to allow the motor speed to rise before the CVT starts upshifting during an acceleration from a low speed or to lower the ratio if proper conditions are met. This is caused by a cam system that tends to move the movable flange towards the fixed flange of the driven pulley when the torque increases, thereby pulling back on the drivebelt and fighting the opposite force from the driving pulley.

A conventional cam system of a driven pulley comprises a cam plate having a plurality of symmetrically-disposed inclined cam surfaces on which respective cam followers are engaged. The cam followers are generally slider buttons or rollers. The cam plate or the set of cam followers is mounted at the back side of the movable flange and the other of them is rigidly connected to the main shaft.

BACKGROUND OF THE INVENTION

In a scooter, a conventional CVT further comprises a centrifugal clutch mounted next to the driven pulley. The centrifugal clutch is used to disengage the mechanical connection between the driven pulley and the output shaft when the scooter is stopped or if it moves too slowly. This allows the motor to at least operate at idle speed. The driving pulley, the driven pulley and the drivebelt are always rotating when the motor operates. Whenever the rotation speed of the motor increases, the rotation speed of the driven pulley increases as well and the clutch is moved to its engaged position under the effect of the centrifugal force that acts on small inwardly-biased flyweights. The flyweights are provided with friction pads. These pads eventually reach the interior side of a drum and force it to rotate as the friction engagement increases with an increase of the rotation speed. The friction pads and the drum remain connected as long as the rotation speed is above a threshold value.

The CVT of a scooter is generally located in a protective housing. This housing have the drawback of reducing the heat transfers between the CVT and the atmosphere. Yet, the centrifugal clutch is an important heat source. The temperature reached inside the housing during the operation of the CVT can be quite high, especially when the CVT is used in a hot environment. This may reduce the service life of the drivebelt since it generally decreases when the average operating temperature increases.

Unlike scooters and other vehicles, snowmobiles have successively used CVTs that are provided only with a driving pulley, a driven pulley and a drivebelt. The driving pulley is used as a clutch since the spacing between the two flanges thereof is allowed to be greater than the width of the drivebelt at low motor rotation speed. This corresponds to the disengaged position of the CVT and no force is then transmitted to the drivebelt from the motor, which is allowed to rotate freely at idle speed. As soon as the rotation speed of the motor increases, the flyweights inside the driving pulley come into action and force the movable flange to move toward the fixed flange. The drivebelt will eventually be gripped between the two flanges and the CVT will be in the engaged position. The drivebelt remains engaged in the driving pulley until the rotation speed is low enough so that the movable flange be moved out of engagement with the drivebelt under the action of the return spring.

In normal operating conditions, using the sides of a drivebelt as a friction element for the progressive engagement of the CVT does not significantly wear a good quality drivebelt. Recent improvements in the field of drivebelts lead to products that can have a long service life, in spite of the intense solicitation of the material. These drivebelts comprise Kevlar® or other synthetic materials. Moreover, the use of the drivebelt as the clutch is more efficient and generates less heat that the conventional centrifugal clutch with friction pads.

As aforesaid, a conventional driving pulley is usually provided with an helical spring to generate a return force. The return force generated by the spring is inversely proportional to the distance between the movable flange and the fixed flange. This is exactly the opposite of what it should be. Ideally, the return force should be maximum at the position of the movable flange where the drivebelt is disengaged and be proportional to the distance between the flanges of the driving pulley. A weaker return force at a higher ratio allows the driving pulley to respond more quickly and be more efficient.

BRIEF SUMMARY OF THE INVENTION

It is the object of the present invention to provide a scooter with a CVT that uses the drivebelt as a clutch instead of a conventional centrifugal clutch with friction pads. One of the advantages of such arrangement is the reduction of the average temperature inside the housing of the CVT, which thus increases the service life of the drivebelt. It is also an object of the present invention to provide a driving pulley with a return mechanism that generates a return force proportional to the distance between the two flanges, more particularly a return force which decreases when the two flanges are moved closer to each other. More particularly, the present invention provides a driving pulley for a continuously variable transmission, the driving pulley being coaxially mountable around a drive shaft and rotatable at a variable rotation speed, the driving pulley comprising:

a first flange having one side provided with a conical wall;

a second flange having opposite first and second sides, the second flange being coaxial with the first flange and having a conical wall provided on the first side thereof, the conical wall facing the conical wall of the first flange to form a drivebelt-receiving groove around which a drivebelt is partially wound, the second flange being axially movable with reference to the first flange between a distal position and a proximal position;

a first means for connecting the first flange to the drive shaft in a torque-transmitting engagement;

a second means for connecting the second flange to the drive shaft in a torque-transmitting engagement;

a third means for generating a first force urging the second flange to move towards the first flange, the third means being responsive of the rotation speed of the driving pulley; and a fourth means for generating a second force urging the second flange to move away from the first flange.

The driving pulley is characterized in that:

the fourth means generate the second force with a maximum magnitude when the second flange is substantially at the distal position and with a minimum magnitude when the second flange is substantially at the proximal position; and the drivebelt-receiving groove is wider than the drivebelt when the second flange is at the distal position, whereby there is no contact between the conical wall of the second flange and a corresponding side of the drivebelt when the second flange is at the distal position.

According to another aspect of the present invention, there is provided a driving pulley for a continuously variable transmission, the driving pulley being coaxially mountable around a drive shaft and rotatable at a variable rotation speed, the driving pulley comprising:

a first flange having one side provided with a conical wall;

a second flange having opposite first and second sides, the second flange being coaxial with the first flange and having a conical wall provided on the first side thereof, the conical wall facing the conical wall of the first flange to form a drivebelt-receiving groove around which a drivebelt is partially wound, the second flange being axially movable with reference to the first flange between a distal position and a proximal position;

a first means for connecting the first flange to the drive shaft in a torque-transmitting engagement;

a second means for connecting the second flange to the drive shaft in a torque-transmitting engagement;

a set of flyweights to generate a first force urging the second flange to move towards the first flange, each symmetrically-disposed around the drive shaft between a corresponding pair of opposite and outwardly-converging ramps, one of the ramps of each pair being provided on the second side of the second flange and the other being provided on an interior side of an end plate facing the second side of the second flange and fixed with reference to the first flange; and a fourth means for generating a second force urging the second flange to move away from the first flange.

The driving pulley is characterized in that it further comprises at least one torsion spring having at least one coiled portion and a lever arm, the lever arm being in a sliding engagement with a corresponding convexly curved ramp, the coiled portion being connected to one among the second flange and the end plate, and the convexly curved ramp being provided on the other of them.

BRIEF DESCRIPTION OF THE DRAWINGS

The present invention will be better understood from the following description and appended figures in which.

DETAILED DESCRIPTION

Figure 9:
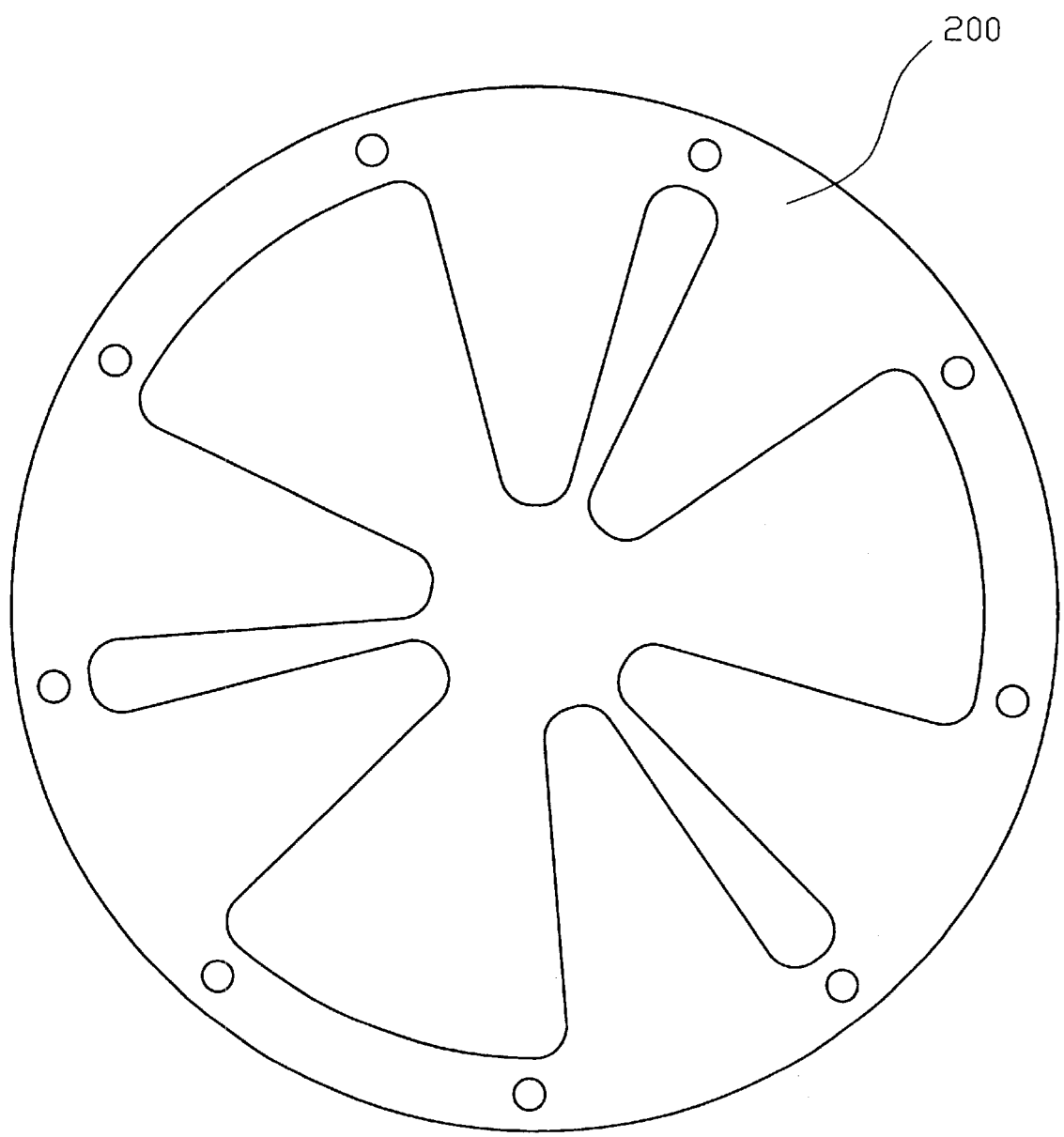
FIG. 9 is a front elevation view of a Belleville spring.
Figure 10:
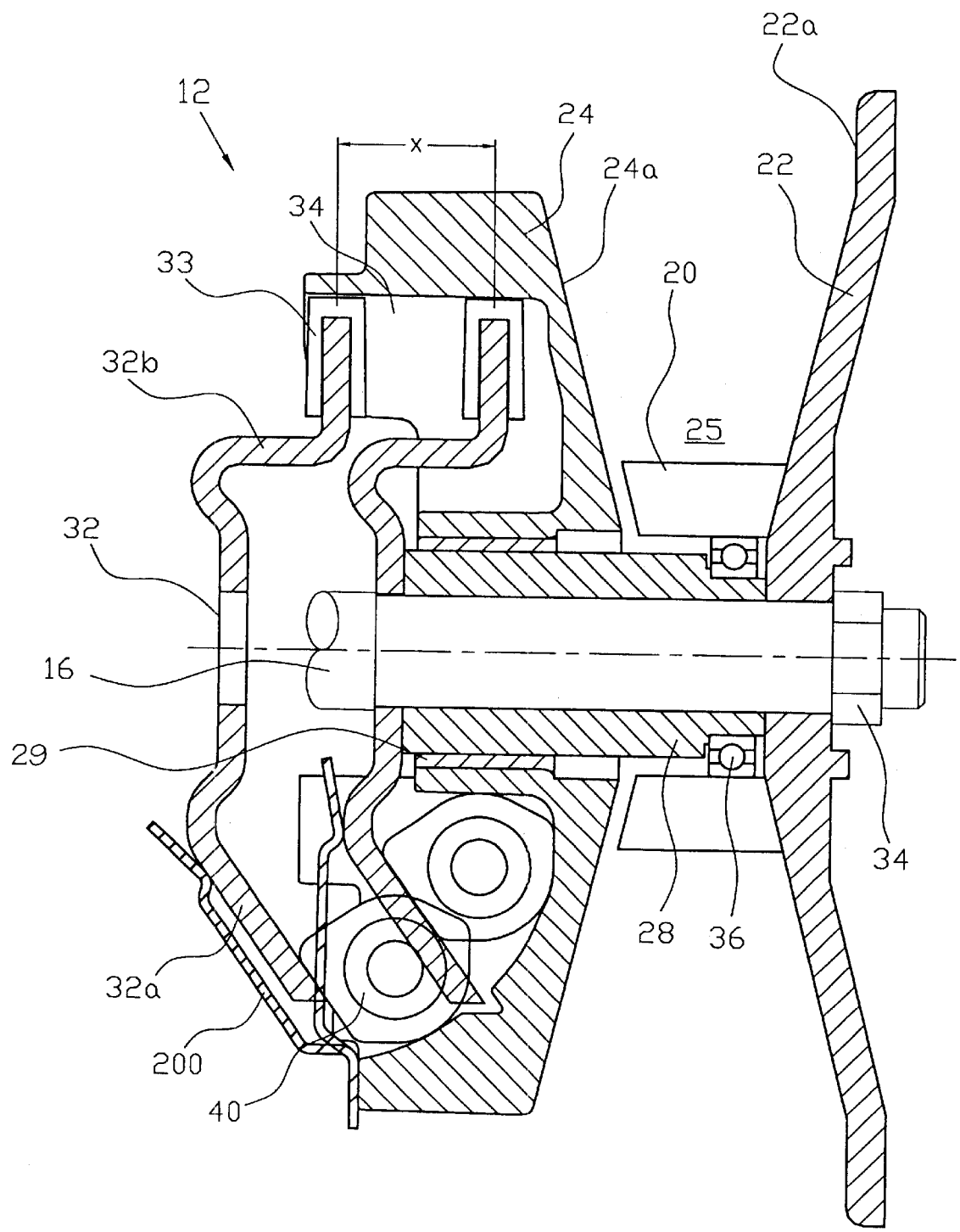
FIG. 10 is a longitudinal cross-sectional view of the driving pulley according to a third embodiment, showing the driving pulley in a disengaged position and showing the position of some of the same elements in an engaged and high ratio position.
Figure 11:
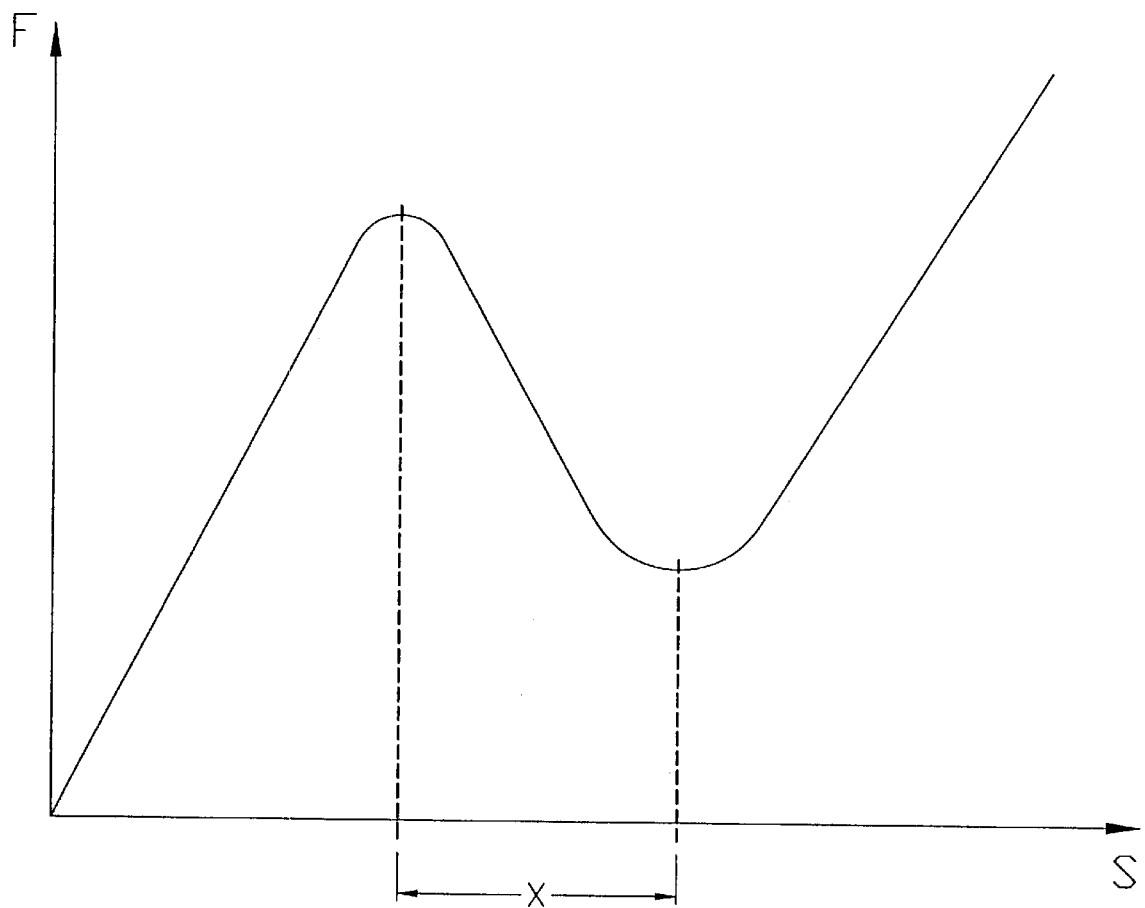
FIG. 11 is a graph illustrating a typical example of the relationship between the spring force and the deflection of a Belleville spring.

A driving pulley (12) according to three possible embodiments of the present invention are described hereinafter and illustrated in the appended figures. The first and preferred embodiment is shown in FIGS. 1 to 5. The second embodiment in shown in FIGS. 6 to 8. FIGS. 9 to 11 show the third embodiment.

These embodiments are well adapted for relatively small driving pulleys, such as the ones found in the CVTs of scooters and other small vehicles. However, their use is not limited to those vehicles and driving pulleys incorporating these features can be used in all other suitable applications as well.

First Embodiment: Torsion Springs

Figure 1:
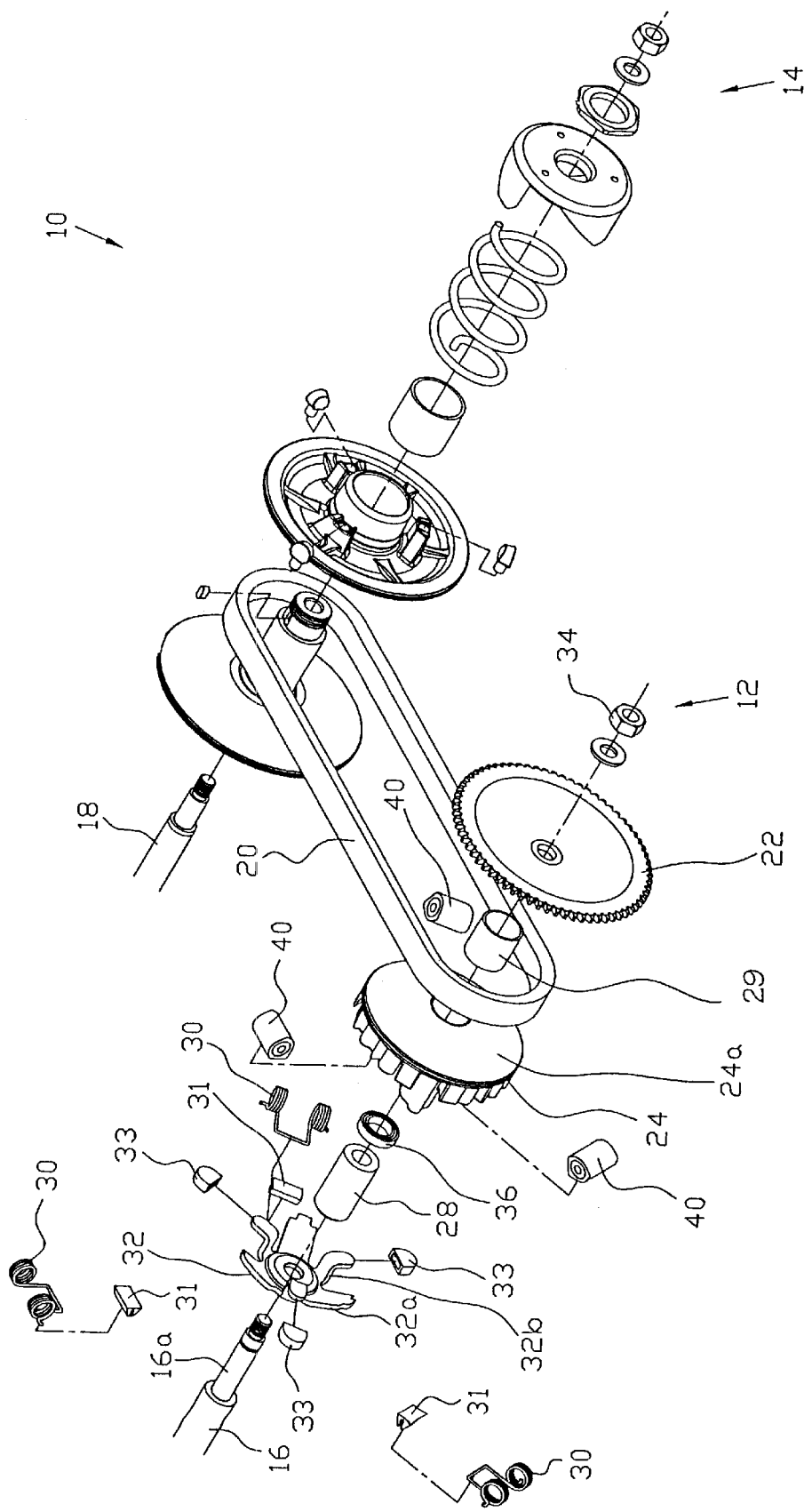
FIG. 1 is an exploded perspective view of a CVT incorporating a driving pulley according to a first and preferred embodiment of the present invention.

FIG. 1 is an exploded perspective view of a typical CVT (10) according to the first embodiment of the present invention and which is to be used in a scooter. The CVT (10) comprises a driving pulley (12) and a driven pulley (14). The driving pulley (12) is coaxially mounted on a drive shaft (16) that is mechanically connected to a motor (not shown). The driven pulley (14) is coaxially mounted on an output shaft (18) that is mechanically connected to the rear wheel (not shown) or any other parts to be driven. A drivebelt (20) is partially wound around the driving pulley (12) and the driven pulley (14).

The driving pulley (12) comprises a first flange, also called "fixed flange (22)", and a second flange, also called "movable flange (24)", that is axially movable with reference to the fixed flange (22). The periphery of the inner conical wall (22a) of the fixed flange (22) is provided with a plurality of teeth (22b) used for engagement with the pinion of the starter (not shown). A back plate (22c) is located on the opposite side.

The movable flange (24) is mounted around a spacer (28) surrounded by a bushing (29). An end plate (32) faces the back side of the movable flange (24). These parts are inserted on a section (16a) of the drive shaft (16) having a smaller diameter. A nut is used to rigidly connect the fixed parts of the driving pulley (12) to the drive shaft (16). Of course, there are many other ways of achieving a rigid connection, as apparent to a person skilled in the art.

Preferably, a bearing (36) is used to eliminate the parasitic driving torque that can be transmitted by friction between the spacer (28) and an inner side of an upper section of the drivebelt (20) when the conical wall (24a) of the movable flange (24) is not in contact with the corresponding side of the drivebelt (20). The drivebelt (20) then falls towards the center of the driving pulley (12) due to gravity. The bearing (36) is coaxially mounted around the drive shaft (16) between the fixed (22) and the movable flange (24), more particularly around an end of the spacer (28). The outer surface of the outer race of the bearing (36) will support the inner side of an upper section of the drivebelt (20).

Preferably, a set of symmetrically-disposed flyweights (40) is provided between the back side of the movable flange (24) and first arms (32a) of the end plate (32). The actual form of the flyweights (40) may differ from what is illustrated in the appended figures, as apparent to a person skilled in the art. There are preferably three flyweights (40) and an identical number of first arms (32a).

The back side of the movable flange (24) is provided with a set of ramps (42). Each ramp (42) faces a respective first arm (32a) and converge therewith toward the exterior. The interior side of the first arms (32a) also form ramps (44). Each flyweight (40) is then set between a corresponding pair of opposite and outwardly-converging ramps (42,44). An outward movement of the flyweights (40) will push the ramps (42,44) away from each other, thus bringing the movable flange (24) closer to the fixed flange (22).

Figure 2:
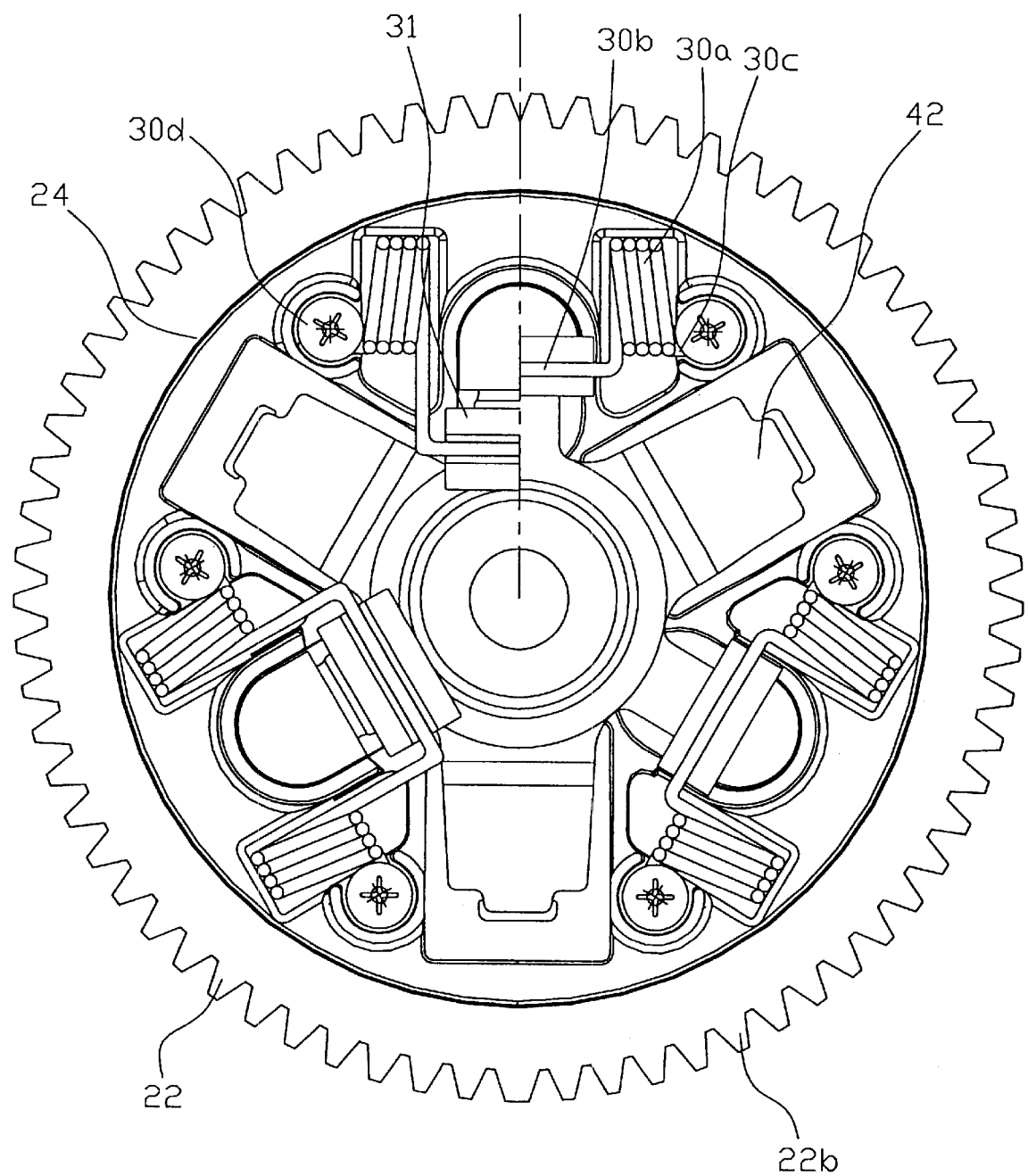
FIG. 2 is a rear elevation view of the movable flange of the driving pulley shown in FIG. 1.

The first embodiment uses at least one torsion spring (30) that is preferably mounted on the back side of the movable flange A4 of the driving pulley (12). There are preferably three torsion springs (30). These springs (30) are double-sided and each of them comprise two opposite coil portions (30a) having a lever arm (30b) defined between them. Other kinds and quantity of torsion springs (30) are also possible. As shown in FIG. 2, the end prongs (30c) of each spring (30) are clamped by a bolt (30d) which also control the initial load of the corresponding spring (30). The lever arm (30b) is connected to a skid (31) made of a material having a low friction coefficient with metal. Each skid (31) is in engagement with a convexly curved ramp (50) provided on the exterior side of a respective second arm (32b) of the end plate (32). Each second arm (32b) has a substantially L-shaped end. Sliding buttons (33) or the like are provided at the tip of the second arms (32b) for achieving a sliding engagement with a respective slot (34) located on the back side of the movable flange (24). The sliding buttons (33) are made of a low friction material. This allows the torque to be transferred between the end plate (32) and the movable flange (24), regardless of the axial position of the latter. It should be noted that other means can be provided to connect the second flange (24) to the drive shaft (16). For instance, a linear bearing (not shown) can be used.

Figure 3:
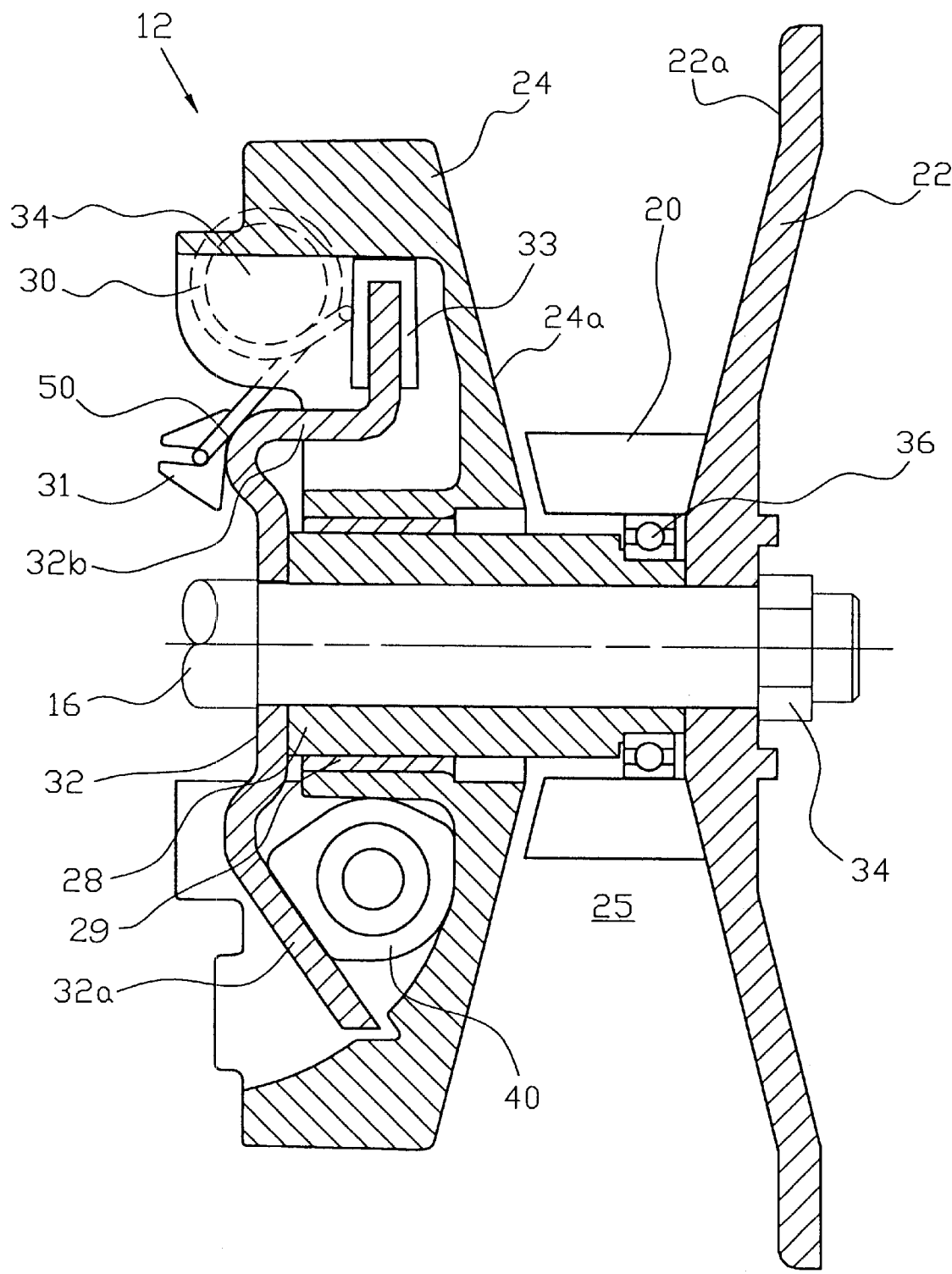
FIG. 3 is a longitudinal cross-sectional view of the driving pulley shown in FIG. 1, showing the driving pulley in a disengaged position.
Figure 4:
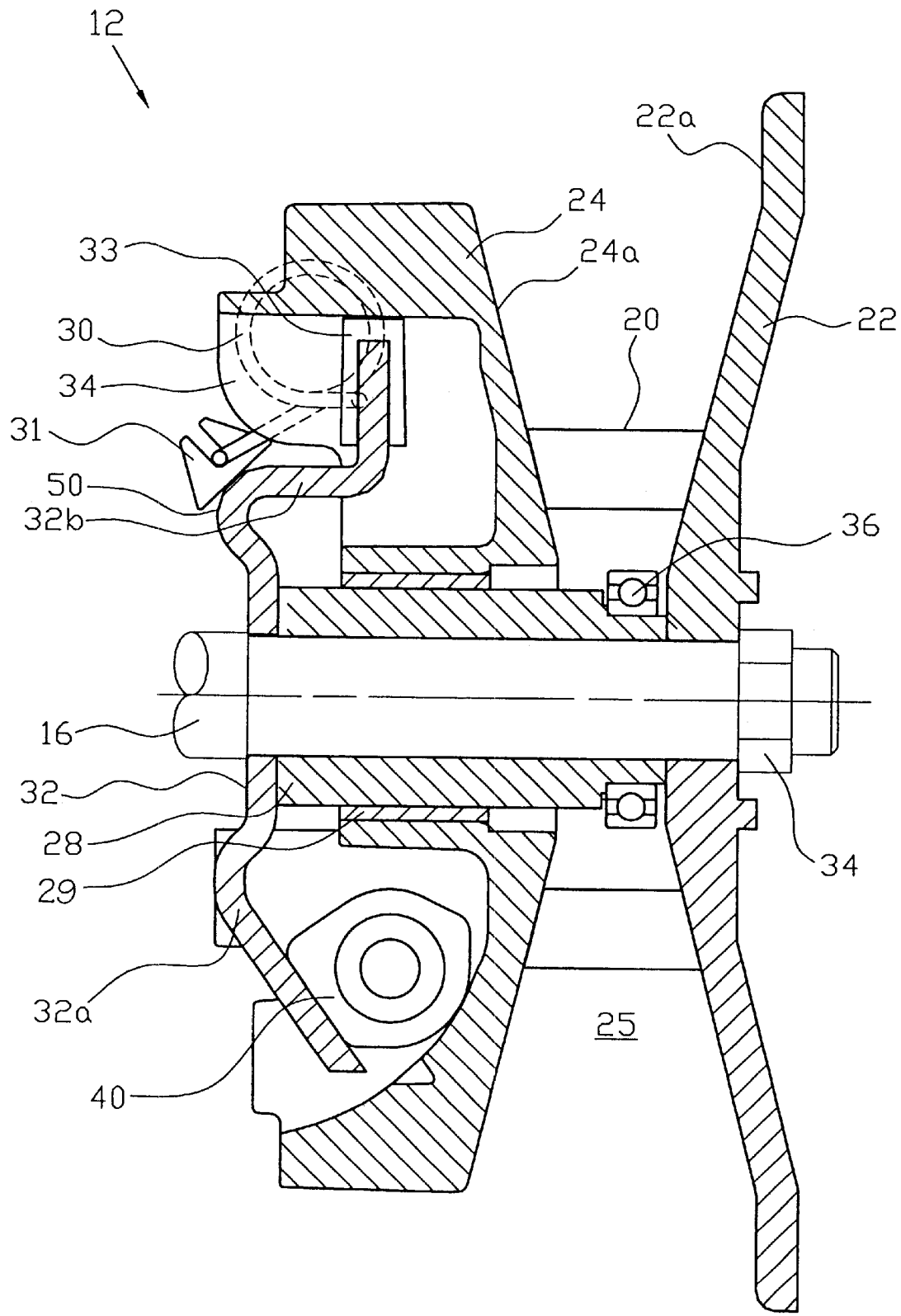
FIG. 4 is a view similar to FIG. 3, showing the driving pulley in an engaged position and at a low ratio.
Figure 5:
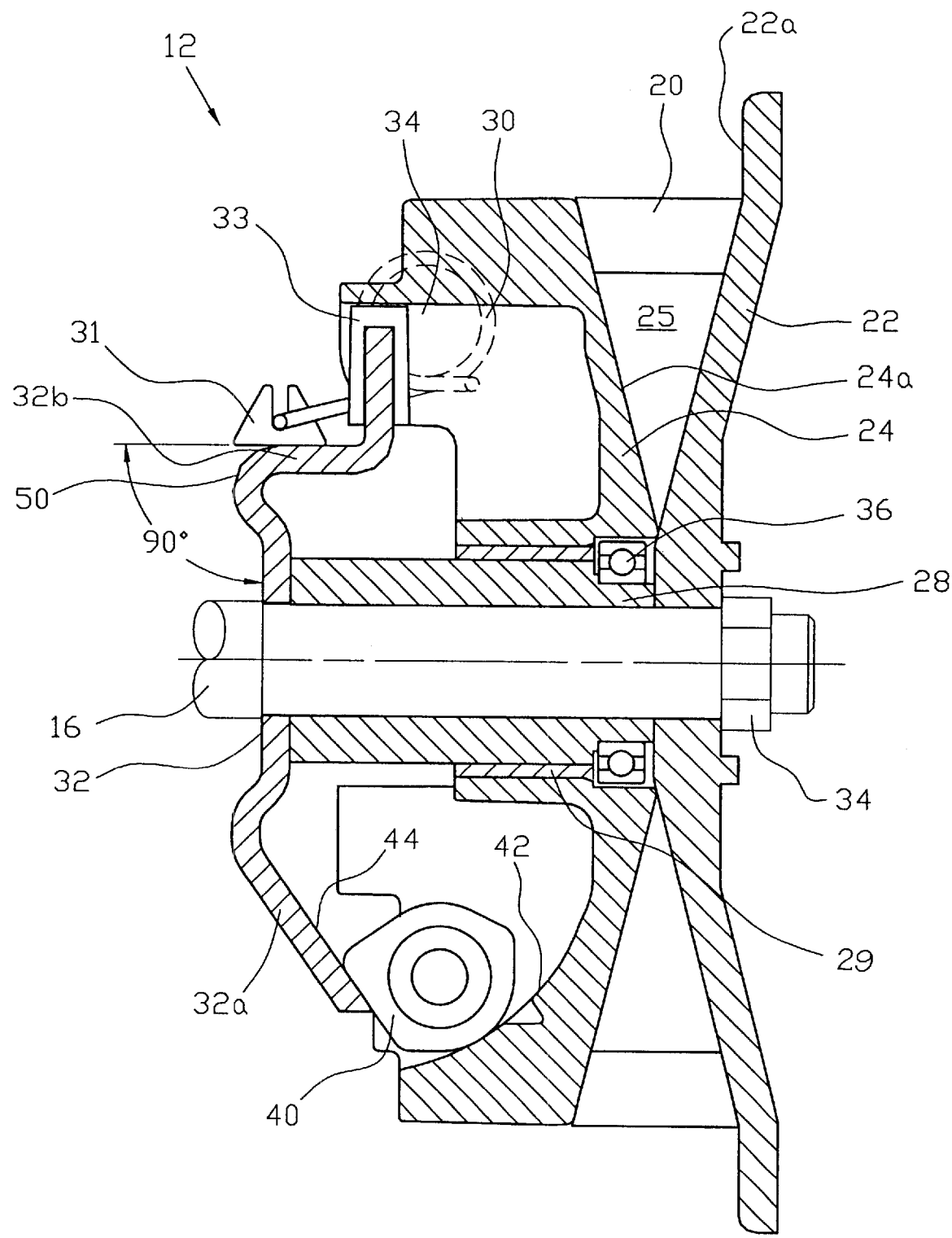
FIG. 5 is a view similar to FIGS. 3 and 4, showing the driving pulley in an engaged position and at a high ratio.

The specific shape of the second arms (32b) allows the angle of the return force vector to vary in function of the relative position between the movable flange (24) and the end plate (32). As shown in FIGS. 3 to 5, the axial component of the return force vector is orthogonal with reference to the longitudinal axis of the driving pulley (12) when the movable flange (24) is away from the end plate (32) and close to the fixed flange (22). This corresponds to the position range where the drivebelt (20) is in engagement with the driving pulley (12) and there is virtually no return force from the springs (30). On the other hand, the angle is substantially parallel to the longitudinal axis when the movable flange (24) is close to the end plate (32) and away from the fixed flange (22). This corresponds to the position range where the drivebelt (20) is disengaged from the driving pulley (12). This arrangement thus accomplishes the desired goal, which is to provide a return force that is proportional to the distance between the movable flange (24) and the fixed flange (22).

Figure 12:
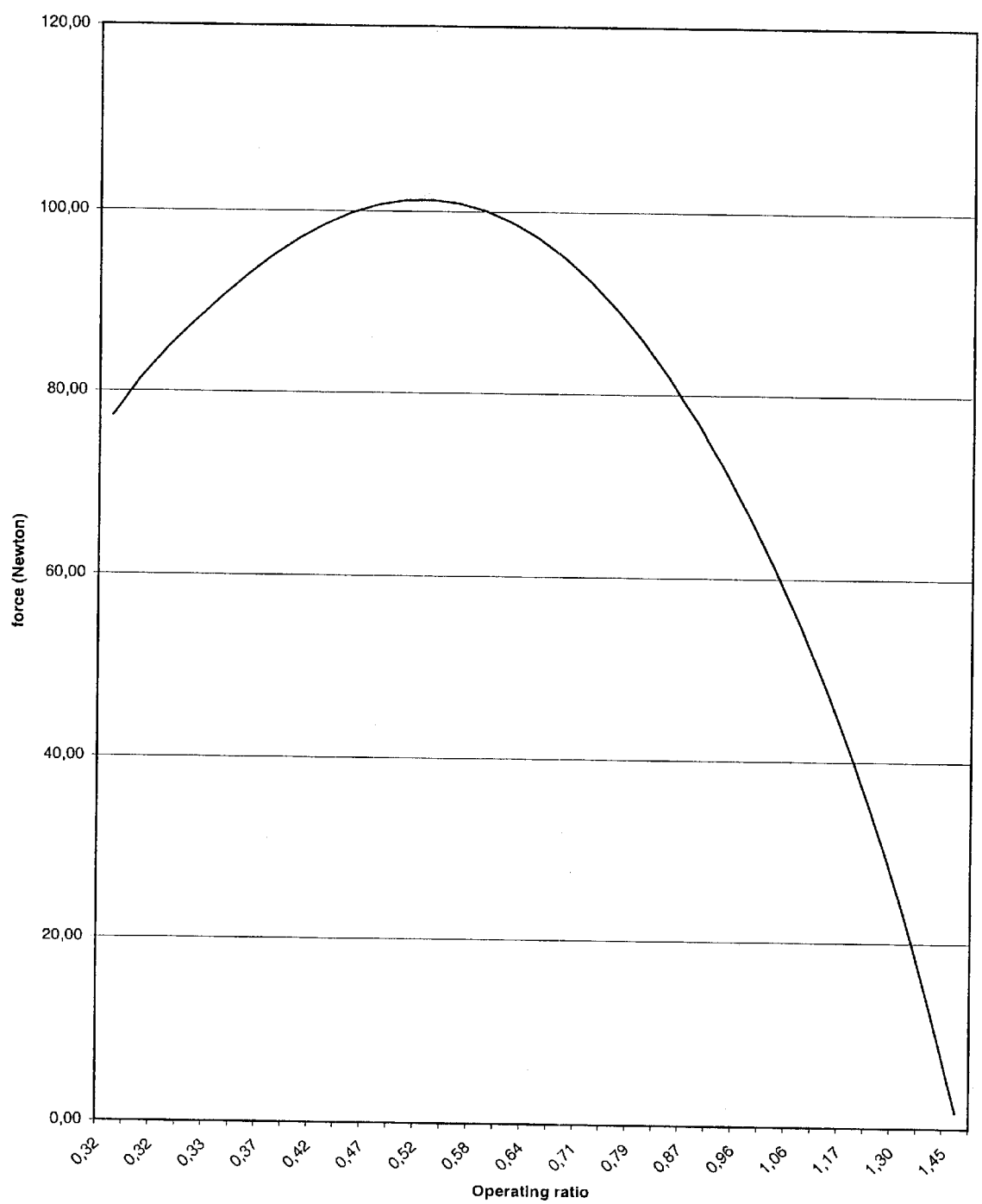
FIG. 12 is a graph showing an example of the relationship between the axial force from the torsion springs and the ratio of the driving pulley.

FIG. 12 shows an example of the relationship between the axial force from the torsion springs (30) and the ratio of the driving pulley (12).

Second Embodiment Magnets

Figure 6:
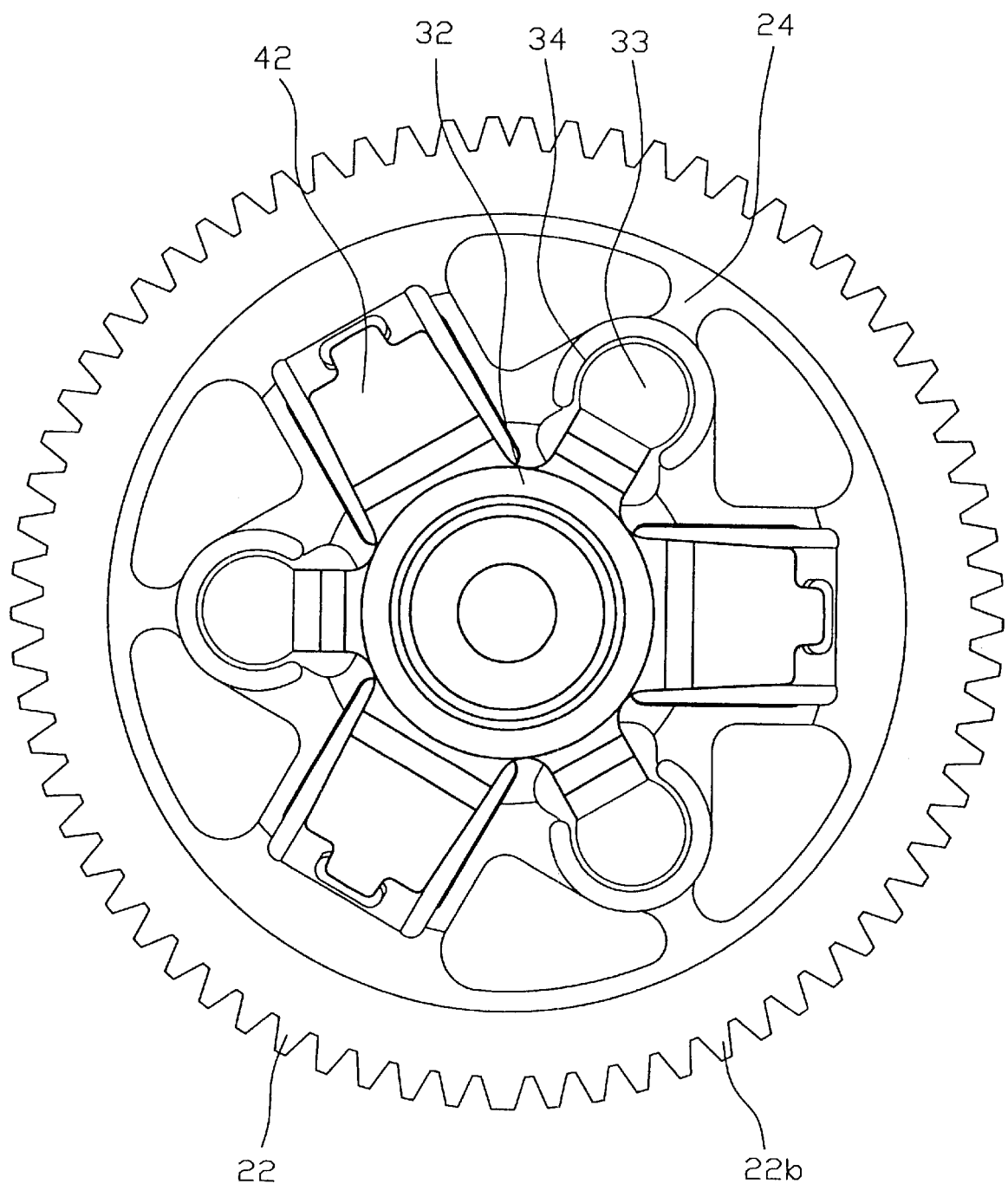
FIG. 6 is a rear elevation view of the movable flange of the driving pulley according to a second embodiment of the present invention.
Figure 7:
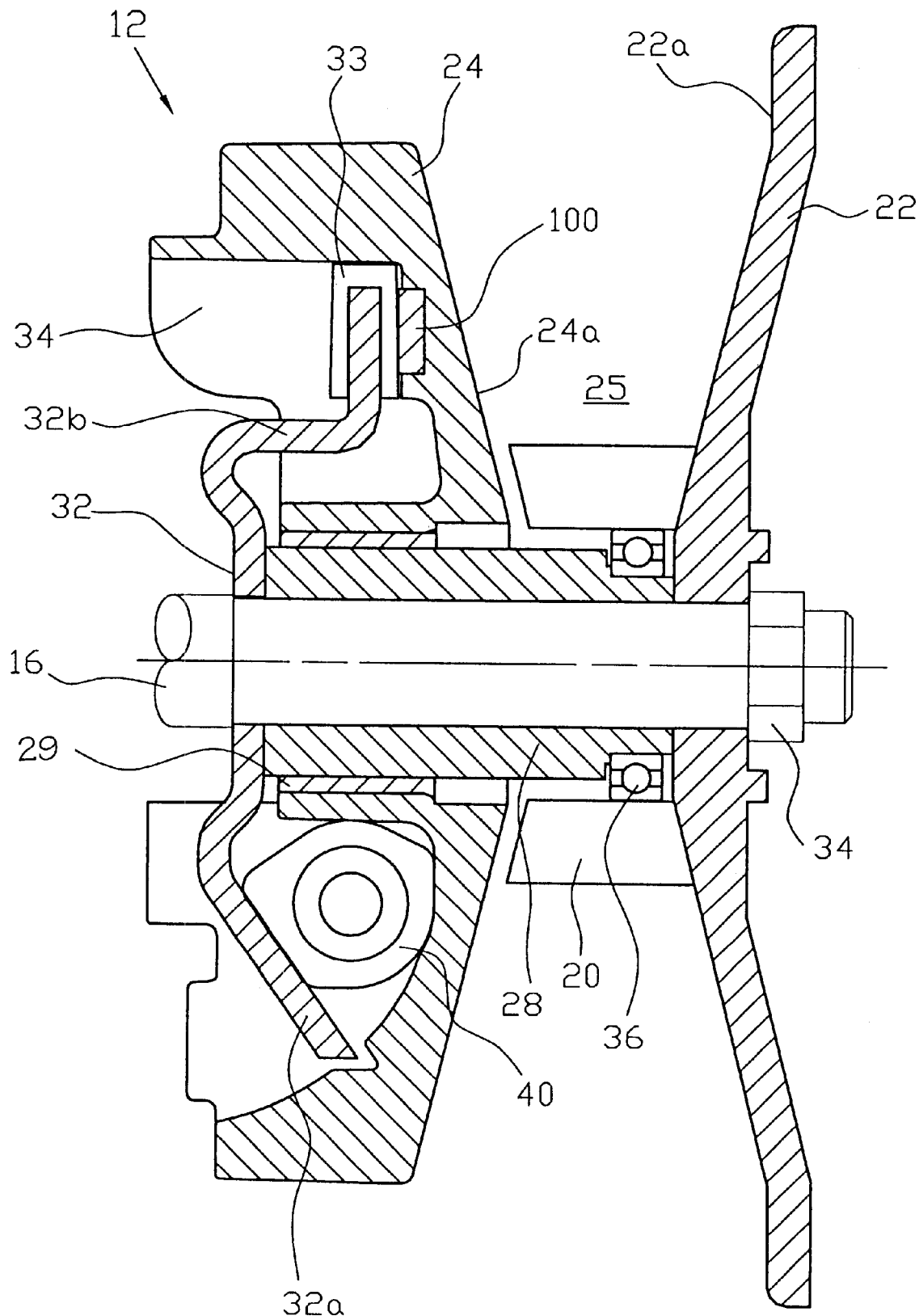
FIG. 7 is a longitudinal cross-sectional view of the driving pulley according to the second embodiment, showing the driving pulley in a disengaged position.
Figure 8:
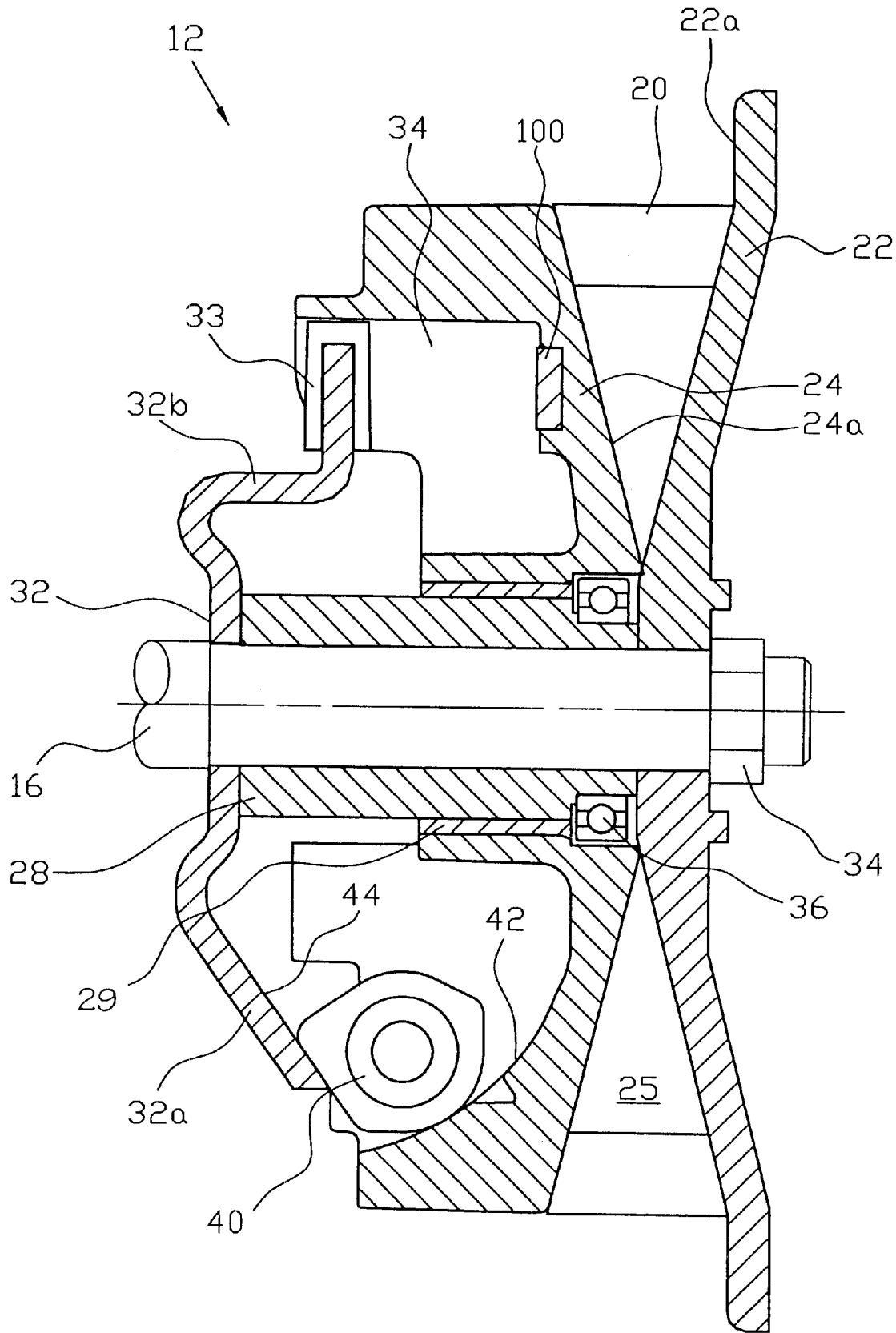
FIG. 8 is a view similar to FIG. 7, showing the driving pulley in an engaged position and at a high ratio.

This embodiment is depicted in FIGS. 6 to 8. Most of the parts of the CVT (10) in this embodiment are identical or similar to the ones of the first embodiment. The main difference is that the torsion springs are replaced by magnets (100). These magnets (100) are preferably located in respective bores in the back side of the movable flange (24). They attract the end of the second arms (32b) when they are close to them. They thus come into action only near or at the disengaged position. The return force becomes insignificant as soon as the movable flange (24) and the end plate (32) are slightly away from each other. The magnets (100) are made of an appropriate metallic material. Alternatively, the magnets (100) can be mounted on the second arms (32b) and act on the back side of the movable flange (24). Also, an opposite set of magnets (not shown) can also be provided on the second arms (62) or the movable flange (24).

Third Embodiment Belleville Spring

The third embodiment is depicted in FIGS. 9 to 11. Again, most of the parts of the CVT (10) in this embodiment are identical or similar to the ones of the first embodiment. The main difference with the first embodiment is that the torsion springs are replaced by a Belleville spring (200) mounted between the back side of the movable flange (24) and the end plate (32). As shown in FIG. 11, the Belleville spring (200) is a spring that provides a negative spring rate over a specific range of deflection. The driving pulley (12) is thus designed such that the position range (x) of the movable flange (24) corresponds to that specific range of deflections. The return force is then maximum when the movable flange (24) is close to the end plate (32) and away from the fixed flange (22), and minimum when the movable flange (24) is away from the end plate (32) and close to the fixed flange (22). FIG. 10 shows these two positions.

The invention is not limited to the described embodiments and encompasses any alternative embodiments within the limits defined by the claims.

What is claimed is:

1. A driving pulley for a continuously variable transmission, the driving pulley being coaxially mountable around a drive shaft and rotatable at a variable rotation speed, the driving pulley comprising:

a first flange having one side provided with a conical wall;

a second flange having opposite first and second sides, the second flange being coaxial with the first flange and having a conical wall provided on the first side thereof, the conical wall facing the conical wall of the first flange to form a drivebelt-receiving groove around which a drivebelt is partially wound, the second flange being axially movable with reference to the first flange between a distal position and a proximal position;

a first means for connecting the first flange to the drive shaft in a torque-transmitting engagement;

a second means for connecting the second flange to the drive shaft in a torque-transmitting engagement;

a third means for generating a first force urging the second flange to move towards the first flange, the third means being responsive of the rotation speed of the driving pulley; and a fourth means for generating a second force urging the second flange to move away from the first flange;

the driving pulley being characterized in that:

the fourth means generate the second force with a maximum magnitude when the second flange is substantially at the distal position and with a minimum magnitude when the second flange is substantially at the proximal position; and the drivebelt-receiving groove is wider than the drivebelt when the second flange is at the distal position, whereby there is no contact between the conical wall of the second flange and a corresponding side of the drivebelt when the second flange is at the distal position.

2. A driving pulley according to claim 1, wherein the first means comprise a rigid connection between the first flange and the drive shaft.

3. A driving pulley according to claim 1, further comprising a bearing coaxially mountable around the drive shaft between the first and the second flange, the bearing having an outer race including an outer surface supporting an inner side of an upper section of the drivebelt when the conical wall of the second flange is not in contact with the corresponding side of the drivebelt.

4. A driving pulley according to claim 1, wherein the driving pulley is mechanically connected to the drive shaft of a scooter.

5. A driving pulley according to claim 1, wherein the third means comprise at least two flyweights symmetrically-disposed around the drive shaft, each flyweight being set between a corresponding pair of opposite and outwardly-converging ramps, one of the ramps of each pair being provided on the second side of the second flange and the other being provided on an interior side of an end plate fixed with reference to the first flange, the interior side facing the second side of the second flange.

6. A driving pulley according to claim 5, wherein the fourth means comprise at least one torsion spring having at least one coiled portion and a lever arm, the lever arm being in a sliding engagement with a corresponding convexly curved ramp, tho coiled portion being connected to one among the second flange and the end plate, and the convexly curved ramp being provided on the other one the second flange and the end plate.

7. A driving pulley according to claim 6, wherein the torsion spring and the corresponding convexly curved ramp are each at least two in number.

8. A driving pulley according to claim 7, wherein there are three pairs of torsion spring and corresponding convexly curved ramp.

9. A driving pulley according to claim 6, wherein the lever arm of each torsion spring comprises a low-friction skid.

10. A driving pulley according to claim 5, wherein the second means comprise a sliding engagement between the second flange and the end plate.

11. A driving pulley according to claim 10, wherein the second means comprise at least one slider button located on one among the second flange and the end plate, and at least one corresponding slot located on the other one among the second flange and the end plate.

12. A driving pulley according to claim 5, wherein the fourth means comprise fifth means for creating a magnetic attraction force between the second flange and the end plate, the magnetic attraction force being maximum when the second flange is substantially at the distal position.

13. A driving pulley according to claim 12, wherein the fifth means comprise a magnet mounted on one among the second side of the second flange and an interior side of the end plate, the other of them being provided with a corresponding magnetically-attractable portion in registry with the magnet.

14. A driving pulley according to claim 5, wherein the fourth means comprise a Belleville spring mounted between the end plate and the second flange, the Belleville spring being preloaded to substantially work with a negative spring rate.

15. A driving pulley for a continuously variable transmission, the driving pulley being coaxially mountable around a drive shaft and rotatable at a variable rotation speed, the driving pulley comprising:

a first flange having one side provided with a conical wall;

a second flange having opposite first and second sides, the second flange being coaxial with the first flange and having a conical wall provided on the first side thereof, the conical wall facing the conical wall of the first flange to form a drivebelt-receiving groove around which a drivebelt is partially wound, the second flange being axially movable with reference to the first flange between a distal position and a proximal position;

first means for connecting the first flange to the drive shaft in a torque-transmitting engagement;

second means for connecting the second flange to the drive shaft in a torque-transmitting engagement;

a set of flyweights to generate a first force urging the second flange to move towards the first flange, each flyweight being symmetrically-disposed around the drive shaft between a corresponding pair of opposite and outwardly-converging ramps, one of the ramps of each pair being provided on the second side of the second flange and the other being provided on an interior side of an end plate facing the second side of the second flange and fixed with reference to the first flange; and means for generating a second force urging the second flange to move away from the first flange;

the driving pulley being characterized in that the means for generating a second force comprise at least one torsion spring having at least one coiled portion and a lever arm, the lever arm being in a sliding engagement with a corresponding convexly curved ramp, the coiled portion being connected to one among the second flange and the end plate, and the convexly curved ramp being provided on the other among the second flange and the end plate.

16. A driving pulley according to claim 15, wherein the torsion spring and the corresponding convexly curved ramp are each at least two in number.

17. A driving pulley according to claim 16, wherein there are three pairs of torsion spring and corresponding convexly curved ramp.

18. A driving pulley according to claim 15, wherein the lever arm of each torsion spring comprises a low-friction skid.

19. A driving pulley according to one of claims 15, wherein the second means comprise a sliding engagement between the second flange and the end plate.

20. A driving pulley according to claim 19, wherein the second means comprise at least one slider button located on one among the second flange and the end plate, and at least one corresponding slot located on the other one among the second flange and the end plate.

21. A driving pulley according to claim 15, wherein the first means comprise a rigid connection between the first flange and the drive shaft.

22. A driving pulley according to claim 15, further comprising a bearing coaxially mountable around the drive shaft between the first and the second flange, the bearing having an outer race including an outer surface supporting an inner side of an upper section of the drivebelt when the conical wall of the second flange is not in contact with the corresponding side of the drivebelt.

23. A driving pulley according to claim 15, wherein the driving pulley is mechanically connected to the drive shaft of a scooter.

* * * * *